US012454172B2

(12) United States Patent
Yaguchi et al.

(10) Patent No.: US 12,454,172 B2
(45) Date of Patent: Oct. 28, 2025

(54) IN-WHEEL MOTOR (71) Applicant: GKN Automotive Limited, Birmingham (GB)

(72) Inventors: Yuu Yaguchi, Tochigi (JP); Satoshi Niimura, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 194 days.

(21) Appl. No.: 18/536,340

(22) Filed: Dec. 12, 2023

(65) Prior Publication Data
US 2025/0100370 A1  Mar. 27, 2025

(30) Foreign Application Priority Data

Sep. 25, 2023  (JP) .................................. 2023-159443

(51) Int. Cl.
  *B60K 7/00*   (2006.01)
  *B60B 27/02*  (2006.01)
  *H02K 7/00*   (2006.01)

(52) U.S. Cl.
  CPC ............ *B60K 7/0007* (2013.01); *B60B 27/02* (2013.01); *H02K 7/003* (2013.01)

(58) Field of Classification Search
  CPC ....... B60K 7/0007; B60K 27/02; H02K 7/003
  See application file for complete search history.

(56) References Cited

U.S. PATENT DOCUMENTS

| 1,660,792 A | 2/1928 | Hirth |
| 2006/0158050 A1 | 7/2006 | Maeda et al. |
| 2016/0121709 A1 | 5/2016 | Shin |

FOREIGN PATENT DOCUMENTS

| CN | 102673380 B | 12/2014 |
| DE | 102006002421 A1 | 7/2006 |
| JP | 2023034574 A | 3/2023 |

OTHER PUBLICATIONS

GKN Automotive Press Release; More Compact and Lighter for the Modern Premium Drivetrain: Face Spline Joint Technology from GKN Automotive; Accessed Jul. 25, 2024 (13 pages).
DE Office Action for DE Application No. 102023136612.2 dated Jul. 26, 2024 (9 pages).

*Primary Examiner* — Terrance L Kenerly
(74) *Attorney, Agent, or Firm* — Reising Ethington P.C.

(57) ABSTRACT

An in-wheel motor includes a casing at least partly housed in a wheel; a hub rotatable about an axis with a neck portion disposed in the casing and having a first face spline and a flange portion radially expanding outside the casing to combine with the wheel; a stator including an electromagnet for generating a magnetic flux and fixedly supported by the casing; a rotor rotatably supported by the casing and including a shoulder portion having a second face spline to mesh with the first face spline and a disk portion integral with the shoulder portion and radially expanding from the shoulder portion toward the stator to receive the magnetic flux so as to be driven around the axis; and a bolt screwed in the shoulder portion to force the first face spline in close contact with the second face spline.

5 Claims, 7 Drawing Sheets

IN-WHEEL MOTOR

CROSS-REFERENCE TO RELATED APPLICATIONS

This application is based upon and claims the benefit of priority from Japanese Patent Application No. 2023-159443 (filed Sep. 25, 2023), the entire contents of which are incorporated herein by reference.

BACKGROUND

A vehicle using an internal-combustion engine generally requires a long and heavy power transmission system (a driveline) for transmitting torque to wheels. Even an electric vehicle sometimes uses a similar power transmission system. Such a power transmission system causes considerable increase of weight, as it includes many gears, joints and bearings. Furthermore, these gears and joints can cause backlash, and, in turn, the backlash may worsen a ride quality or prevent precise control of power output.

Electric motors can be reduced in size as compared with internal-combustion engines and the layout or deployment of the motors can be relatively flexible. For example, each driving wheel may be given one electric motor and be directly driven thereby. If an electric motor is partly incorporated in a hub of a wheel, the motor is sometimes referred to as "In-wheel motor". Japanese Patent Application Laid-open No. 2023-34574 discloses a related art.

SUMMARY

The disclosure herein relates to a motor for propelling a vehicle and, in particular, to an in-wheel motor at least partly incorporated in a hub of a wheel.

An in-wheel motor does not require a long and heavy power transmission system but nevertheless backlash between a rotor and a shaft is still inevitable. Further, a structure for supporting the motor and the shaft must be packed in a limited space and also must be sufficiently resistant to impact from the road. Such a structure may complicate the assembly and maintenance of the motor and the shaft and may further cause cost increase.

An in-wheel motor for driving a wheel of a vehicle about an axis is provided with: a casing so dimensioned as to be at least partly housed in the wheel; a hub supported by the casing to be rotatable about the axis, the hub including a neck portion disposed in the casing and having a first face spline and a flange portion formed in a unitary body with the neck portion and radially expanding outside the casing to combine with the wheel; a stator including an electromagnet for generating a magnetic flux and fixedly supported by the casing; a rotor rotatably supported by the casing and disposed coaxially with the hub, the rotor including a shoulder portion having a second face spline to mesh with the first face spline, and a disk portion formed in a unitary body with the shoulder portion and radially expanding from the shoulder portion toward the stator to receive the magnetic flux so as to be driven around the axis; and a bolt axially passing through the neck portion and being screwed in the shoulder portion to force the first face spline in close contact with the second face spline.

DESCRIPTION

Exemplary embodiments will be described hereinafter with reference to the appended drawings.

Figure 1:
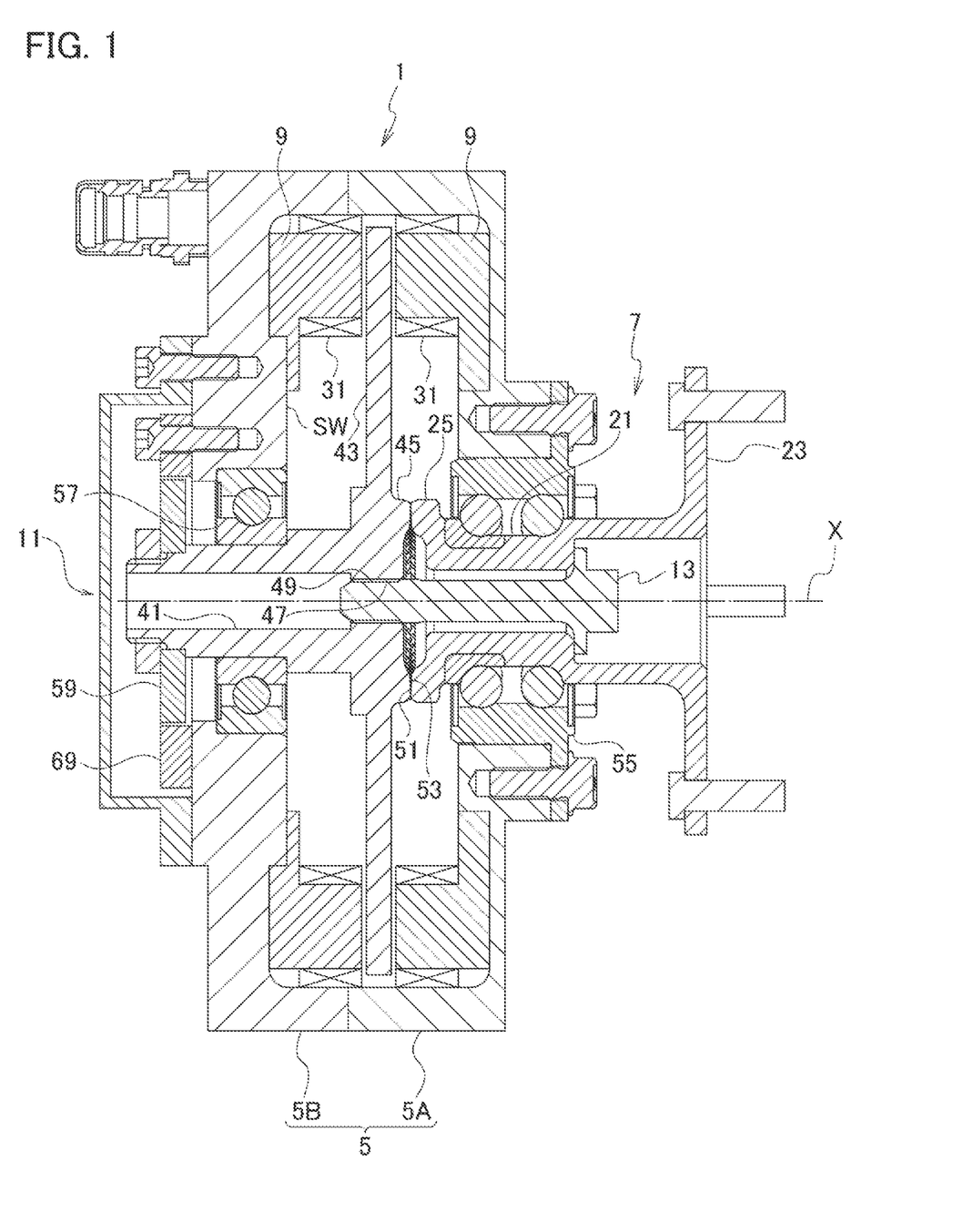
FIG. 1 is a sectional elevational view of an example motor.
Figure 2A:
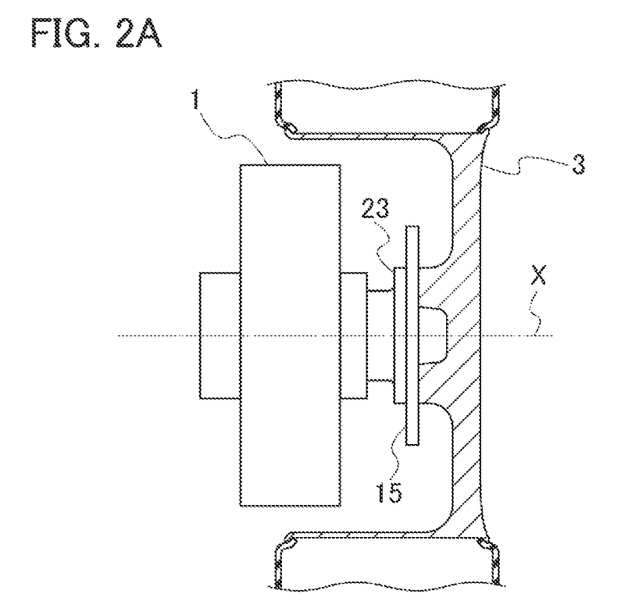
FIG. 2A is a schematic partial sectional view showing a relation of the motor with a tire and a wheel according to an example.
Figure 2B:
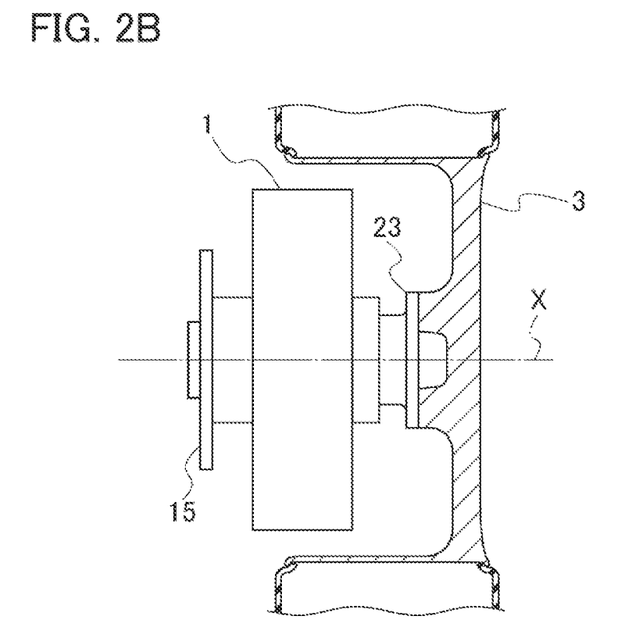
FIG. 2B is a schematic partial sectional view showing a relation of the motor with a tire and a wheel according to another example.

Referring mainly to FIG. 1 in combination with FIG. 2A or FIG. 2B, a motor 1 according to the present embodiment is used for the purpose of driving a wheel 3 of a vehicle about an axis X. A casing 5 of the motor 1 is so dimensioned as to be at least partly housed in the wheel 3, and the motor 1 is thus a so-called "in-wheel motor". Although not shown in these drawings, the casing 5 is connected to a vehicle body via an upper arm and a lower arm of a suspension device for example.

The motor 1 is generally provided with a hub 7 for combining with the wheel 3, a stator 9, a rotor 11, and a bolt 13 for forcing the hub 7 in close contact with the rotor 11. The hub 7, the wheel 3, the stator 9, the rotor 11, and the bolt 13 collectively define the axis X and are mutually coaxial. The stator 9 is fixedly supported by the casing 5. The hub 7 and the rotor 11 are rotatably supported by the casing 5 such that the hub 7 rotates about the axis X, e.g., when the stator 9 electromagnetically propels the rotor 11.

The casing 5 is generally flat and cylindrical. The casing 5 encloses a chamber housing the hub 7, the stator 9 and the rotor 11. For the convenience of assembly, the casing 5 is preferably dividable into a part 5A at the side of the hub 7 and a part 5B at the side of the rotor 11, and these parts are combinable together again. The part 5A and the part 5B may be fastened by bolts or any other means such as engagement, bonding or fusion for example.

The hub 7 includes a neck portion 21 that is relatively narrow and cylindrical, a flange portion 23 that forms a unitary body with the neck portion 21 and expands radially to be larger in diameter, and a root 25 as an end of the neck portion 21 opposite to the flange portion 23. The flange portion 23 extends out of the casing 5, e.g., to serve for coupling with the wheel 3. The root 25 is disposed within the casing 5, e.g., coupled with the rotor 11. The root 25 is, at the neck portion 21, supported by the casing 5.

The flange portion 23 is disk-like to form a sufficiently wide contact area for coupling with the wheel 3 and has a plurality of stud bolts fixedly embedded therein (designed for the Japanese market for example) or a plurality of bolt holes (designed for the European market for example) in which wheel bolts are tightened. In between the flange portion 23 and the wheel 3, as shown in FIG. 2A, any intervening article such as a brake rotor 15 may be interposed, or the flange portion 23 and the wheel 3 may be, as shown in FIG. 2B, in direct contact with each other. In the latter case, the rotor 11 may be partly led out of the casing 5 as illustrated and the brake rotor 15 may be combined therewith, or the rotor 11 may not be led out to the exterior but a brake may be built in the motor 1 unlike the examples in the drawings.

Figure 3:
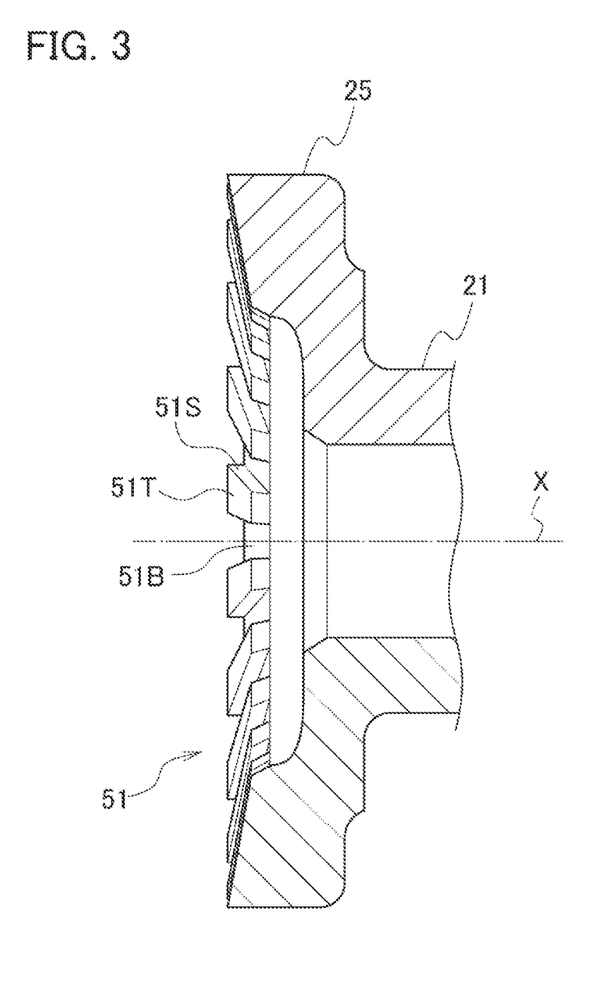
FIG. 3 is a sectional elevational view showing a face spline taken from FIG. 1.

The root 25 is, as described above, a structure for combining with the rotor 11, and has a face spline 51 on its end that faces the rotor 11 as shown as an example in FIG. 3. The face spline 51 is formed of a plurality of splines respectively elongated radially and standing in the direction of the axis X, and the splines are arranged circumferentially around the axis X. Each spline may be a rectangular parallelepiped or any equivalent shape or may, as in the illustrated example, take the form of a truncated pyramid tapered toward the axis X or any equivalent shape. The splines may be arranged on planes perpendicular to the axis X or may be arranged on slightly oblique conical surfaces as illustrated. Specifically, top faces 51T and bottom faces 51B may be respectively arranged on the conical surfaces having vertices at any points on the axis X. The conical surfaces may have a common vertex. Side faces 51S thereof may stand upright on the bottom faces 51B or may be oblique so that each spline is tapered toward the rotor 11.

A similar face spline 53 is engraved on a rim portion 45 of the rotor 11, as described below. The splines 51, 53 may be complementary to each other. When this combination of the face splines 51, 53 is forced into mutually close contact, the pressure creates force in a direction where these elements are directed along the axis X, thereby creating a self-aligning function. The hub 7 and the rotor 11 are thereby prevented from being eccentric. Further, because of the mutual engagement with tight contact, the face splines 51, 53 can transmit torque without backlash.

Referring again to FIG. 1, the following descriptions relate to an axial gap motor in which the stator 9 and the rotor 11 are arranged in the direction of the axis X, but the descriptions are only for illustration purpose and the present embodiments are not necessarily limited to the axial gap motor.

The stator 9 includes a plurality of cores, made of a soft magnet material for example, which are arranged circumferentially at even intervals around the axis X and may be joined together to form a unitary body of the stator 9. Each core has a coil 31 wound around itself to form an electromagnet and magnetic flux generated thereby is conducted axially through each core. To utilize the magnetic flux efficiently, paired stators 9 may be arranged to face each other in the axial direction with the rotor 11 in between them. These stators 9 may be fixedly housed in the casing 5.

The rotor 11 is provided with a shoulder portion 41 that is a substantially cylindrical body for example, a disk portion 43 forming a unitary body with the shoulder portion 41 and expanding radially, and a rim portion 45 corresponding to the root 25. The rotor 11 is rotatably supported by the casing 5, e.g., at the shoulder portion 41, and is thereby rotatable about the axis X. The disk portion 43 takes the form of a disk shape symmetric about the axis X and is elongated toward, and close to, the stators 9 so as to receive the magnetic flux generated by the coils 31. In a case where the stators 9 are paired as shown in the drawing, the disk portion 43 is between, but not in contact with, the paired stators 9, thereby sufficiently receiving the magnetic flux.

The rotor 11, at the disk portion 43 or at least at certain portions facing the cores, is formed of a magnetic material. The rotor 11 structure can be readily produced by a sintering method for example. The production of the rotor 11 may be carried out by producing any magnetic portions and a main portion of the disk portion independently, and thereafter mutually fitting, joining or fusing the portions together. The structure described above causes the disk portion 43 to convert the receiving magnetic flux into torque around the axis X.

The rim portion 45 can be formed in a unitary body at least with the disk portion 43 and may slightly project from the disk portion 43 toward the hub 7. As described above, the rim portion 45 includes the face spline 53 with a shape complementary to the spline 51. As the face splines 51, 53 are mutually in mesh, the torque generated in the disk portion 43 is transmitted through the face splines 51, 53 to the hub 7, and may rotate the wheel 3 and the portion around the axis X.

The bolt 13 passes through the neck portion 21 and is screwed in the rotor 11, e.g., for press-fitting the face spline 51 onto the face spline 53. For this purpose, the disk portion 43 is provided with a bolt hole 47 at its center and the bolt 13 is provided with a corresponding thread 49. In place of, or in addition to, the combination of the bolt hole 47 and the thread 49, however, any proper fastening means that create pressure force in the axial direction may be used.

Figure 4:
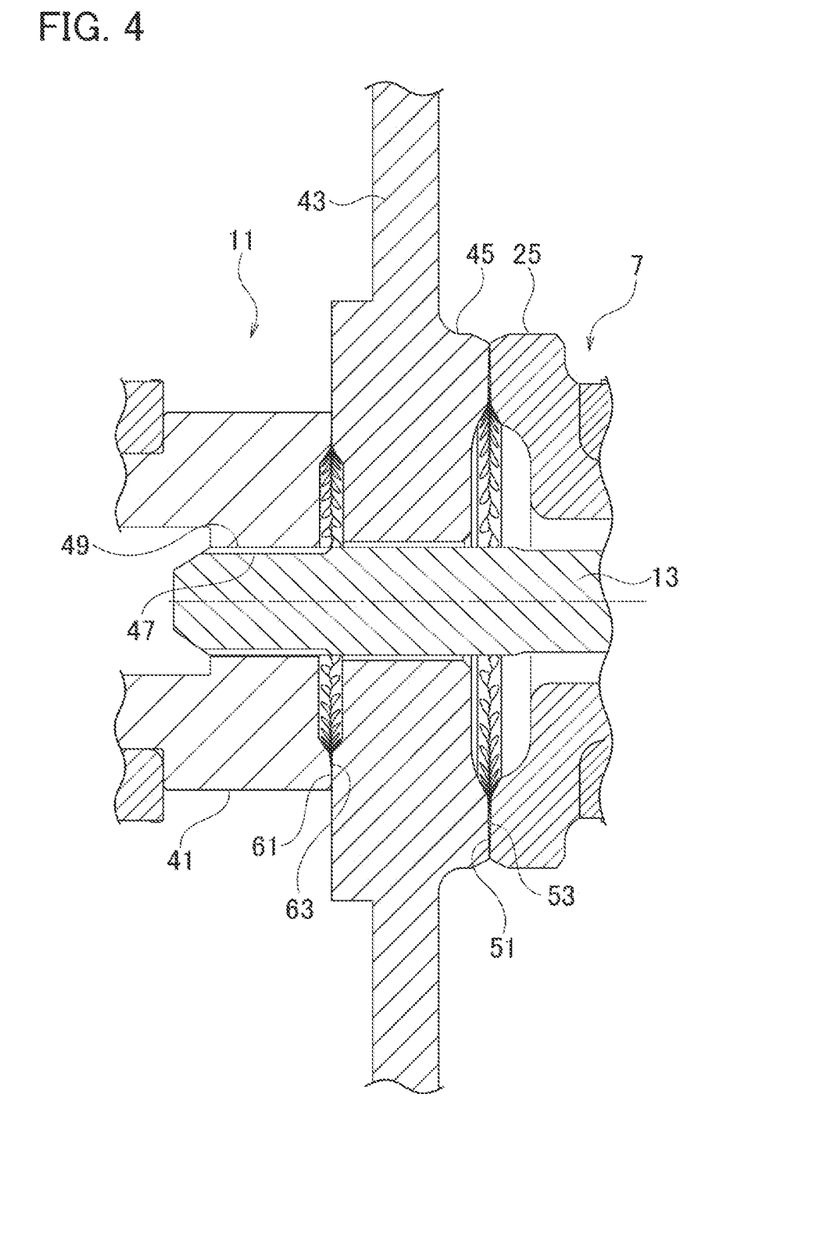
FIG. 4 is a sectional partial elevational view showing an example in which a shoulder portion and a disk portion are separate.

In the rotor 11, the shoulder portion 41 may be a unitary body with the disk portion 43. The shoulder portion 41 and the disk portion 43 may be formed as separate bodies and coupled together as shown in FIG. 4. The coupling may be established by means of face splines 61, 63 in mutually mesh as shown therein. To exert a press-fitting force on the face splines 61, 63, any fastening means such as bolts may be used. For example, the bolt 13 as described already may further pass through the disk portion 43 and then tighten in the shoulder portion 41. In this manner the single bolt 13 may combine the hub 7, the disk portion 43 and the shoulder portion 41 together. In place of the spline coupling, of course, the shoulder portion 41 and the disc portion 43 may be, after produced as separate bodies, unitized by means of brazing, welding, friction welding or such means. In any case, production as separate bodies could be beneficial in applying respective separate materials that are optimal for the separate bodies, and in carrying out any surface treatment such as shot-peening or hardening on a limited area such as a periphery of the shoulder portion 41.

To rotatably support the hub 7 and the rotor 11 around the axis X, ball bearings 55, 57, for example, may be used. One or more of the ball bearings 55, 57 may be a bearing unit in which a plurality rows of bearing in incorporated but it is inessential.

Referring to FIGS. 1 and 4, regardless of whether the shoulder portion 41 and the disk portion 43 are unitized or separate, an available space remains around the shoulder portion 41, e.g., where the in-wheel motor 1 is an axial gap motor. Using this space, the in-wheel motor 1 may be further provided with other elements. For example, as shown on FIGS. 5, 6, and 7, each of the in-wheel motors 1 may include one or more sensors 65, 67, 69 around the shoulder portion 41.

Figure 5:
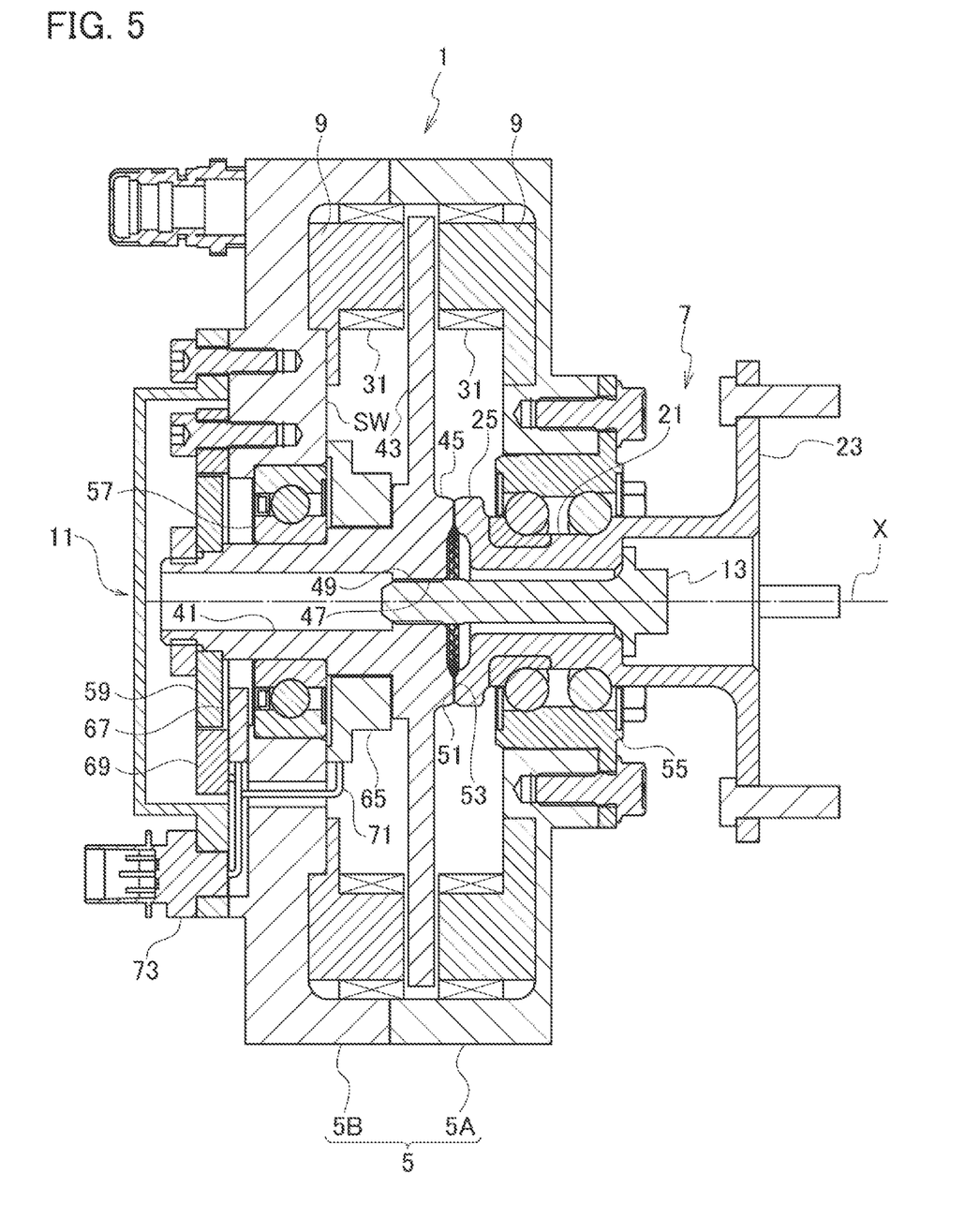
FIG. 5 is a sectional elevational view of a motor according to an example in which the motor includes sensors around a shoulder portion.
Figure 6:
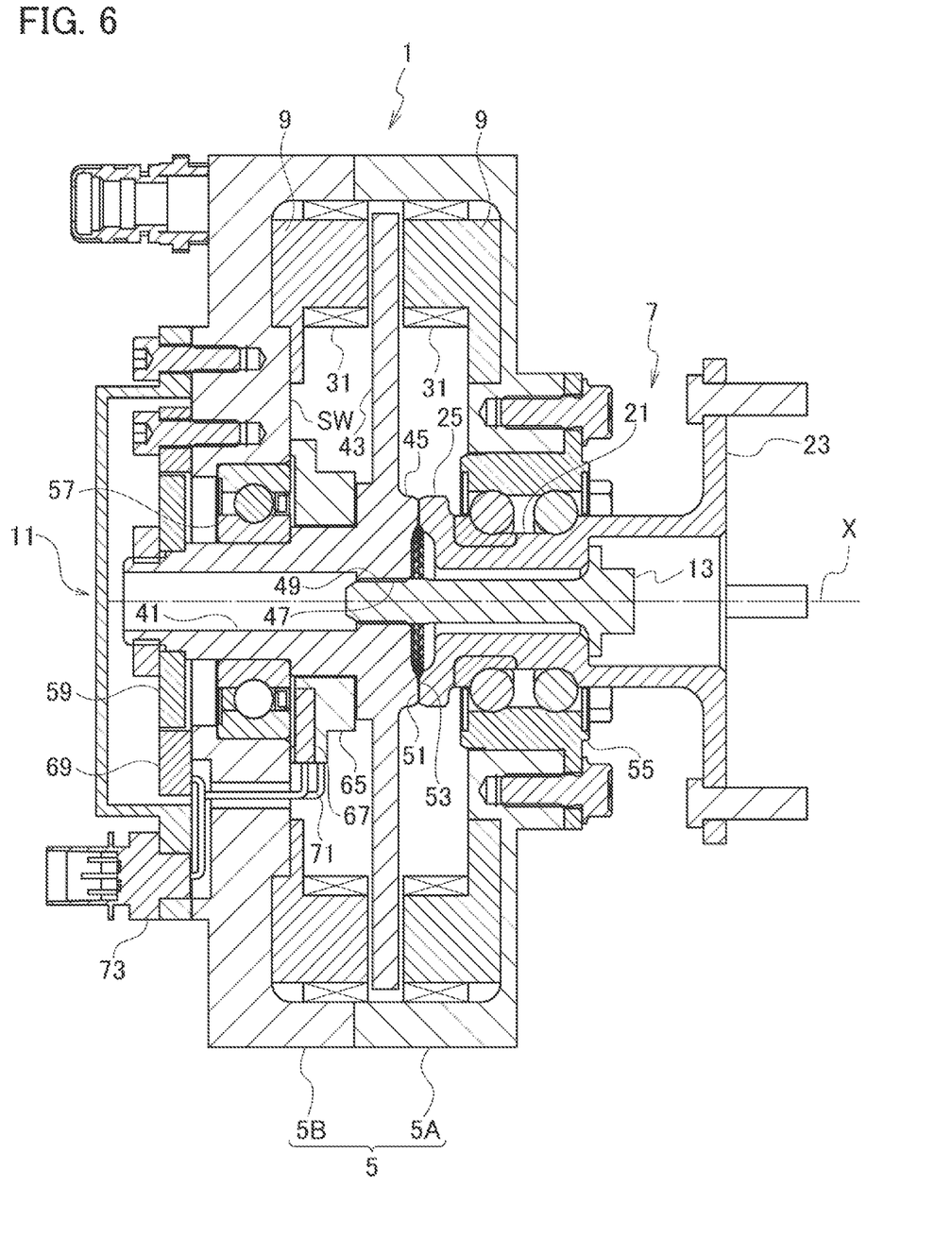
FIG. 6 is a sectional elevational view of a motor according to another example in which the motor includes sensors around a shoulder portion.
Figure 7:
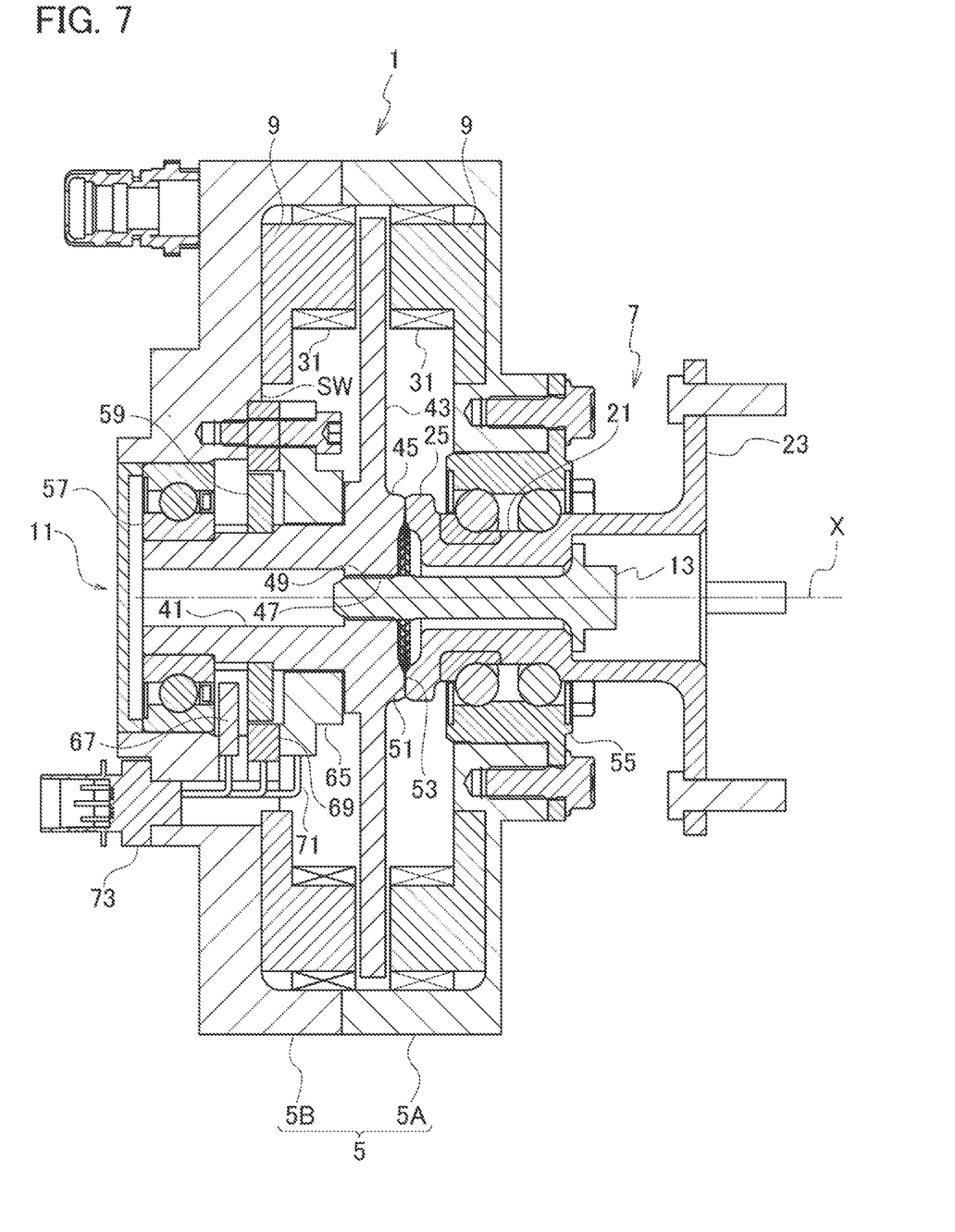
FIG. 7 is a sectional elevational view of a motor according to still another example in which the motor includes sensors around a shoulder portion.

One example of the sensor 65 is a torque sensor. According to an example of a magnetostrictive torque sensor, the sensor 65 creates magnetic flux for example and the magnetic flux at least partly passes through the adjacent shoulder portion 41 and then forms a loop. When torque is applied to the shoulder portion 41, a potential change is created in the sensor 65 and can be measured to monitor the torque generated in the rotor 11. To strengthen the sensor output, surface treatment, such as shot-peening, may be applied to the shoulder portion 41. A torque sensor based on another principle could be used. The output of the torque sensor is input to an electronic control unit (ECU) built-in the vehicle. The output of the torque sensor can be used for control of the motor output.

One example of the sensor 67 is a rotation speed sensor. A magnetic encoder, for example, is attached to the shoulder portion 41 and the rotation speed of the rotor 11 can be detected by reading fluctuation in a magnetic field generated in the sensor 67. Of course, any rotation speed sensor based on any other principle could be used. The output of the rotation speed sensor is input to an ECU and can be used for vehicle control and can substitute for detection of a vehicle speed by any other suitable means.

One example of the sensor 69 is a rotation angle sensor, e.g., a resolver. If a non-circular rotor 59, for example, is fixed to the shoulder portion 41 in such a way as to rotate together therewith, and the sensor 69 including a plurality of electromagnetic coils arranged circumferentially at even intervals is disposed closely to the non-circular rotor 59, inductance would change depending on a rotation angle of the non-circular rotor 11 and the rotation angle of the non-circular rotor 11 can be an output of the sensor 69. Other rotation angle sensors based on other principles may be used. The output of the rotation angle sensor is input to an ECU, for example. The output of the rotation angle sensor may be used for control of rotation of the motor.

The in-wheel motor 1 may include one, two, or all of the sensors 65, 67, 69. The outputs of the sensors 65, 67, 69 are provided through an internal wiring 71 and collectively carried or taken out to the exterior. Of course, the outputs may not be gathered but could be taken out independently from one another. Alternatively, one or more of the outputs may be taken out through an input connector for the motor.

At least one of the sensors 65, 67, 69 may be disposed inside the casing 5. As shown in FIG. 5 for example, the sensor 65 as the torque sensor may be disposed within the casing 5 and secured to an internal surface of a side wall SW of the casing 5, e.g., by means of bolts or such. At least one cable among the internal wiring 71 may be connected to the sensor 65 and led out through a through-hole on the side wall SW to the exterior. This through-hole can be disposed radially inward relative to the stator 9. The sensors 67, 69 may be outside the casing 5. The sensors 67, 69 may be nonetheless covered with a cover.

Alternatively, as shown in FIG. 6, the sensor 67 as the rotation speed sensor may, along with the sensor 65, be disposed inside the casing 5 and fixed together to the side wall SW. The sensor 69, along with the non-circular rotor 59, may be disposed inside the casing 5, as shown in FIG. 7. The sensor 69 may be disposed inward relative to the sensor 67, or may be disposed outward contrary to the drawing. While the order of the sensors 65, 67, 69 can be arbitrary, these sensors are preferably arranged to be mutually adjacent, thereby making the device compact in its axial direction.

According to the present embodiment, the in-wheel motor 1 can accommodate sensors and external sensors for controlling the vehicle may be unnecessary or can be reduced.

Further, as the subjects of measurement are members free from backlash, measurement results are not disturbed by the backlash.

In place of, or in addition to, the torque sensor, the rotation speed sensor, and the rotation angle sensor, the in-wheel motor 1 may be provided with any other sensors, or other elements in place of any of the sensors.

The torque transmission pathway from the disk portion 43 to the flange portion 23 is a unitary body excepting the face splines 51, 53, with no backlash between the face splines 51, 53 as described above. The in-wheel motor 1 enables torque output without backlash and has a simple structure. Further, the in-wheel motor 1 can be readily assembled by incorporating the hub 7 and related components into the part 5A, next incorporating the rotor 11 and related components into the part 5B, and further screwing the bolt 13 therein. Disassembly of the motor can be also enabled by the reverse procedures. More specifically, assembly and maintenance of the in-wheel motor 1 are both easy.

Although certain exemplary embodiments are described above, modifications and variations of the embodiments will occur to those skilled in the art, in light of the above teachings.

What is claimed is:

1. An in-wheel motor for driving a wheel of a vehicle about an axis, the in-wheel motor comprising:
    a casing dimensioned to be at least partly housed in the wheel;
    a hub supported by the casing to be rotatable about the axis, the hub including a neck portion disposed in the casing and having a first face spline and a flange portion formed in a unitary body with the neck portion and radially expanding outside the casing to combine with the wheel;
    a stator including an electromagnet for generating a magnetic flux and fixedly supported by the casing;
    a rotor rotatably supported by the casing and disposed coaxially with the hub, the rotor including a shoulder portion having a second face spline to mesh with the first face spline, and a disk portion formed in a unitary body with the shoulder portion and radially expanding from the shoulder portion toward the stator to receive the magnetic flux so as to be driven around the axis; and
    a bolt axially passing through the neck portion and being screwed in the shoulder portion to force the first face spline in close contact with the second face spline.

2. The in-wheel motor of claim 1, wherein the first face spline and the second face spline respectively comprise a plurality of splines standing axially and arranged circumferentially, whereby the first face spline and the second face spline axially face each other and are in mesh with each other.

3. The in-wheel motor of claim 1, wherein the flange portion and the first face spline form axially both ends of the hub.

4. The in-wheel motor of claim 1, wherein the rotor and the stator constitutes an axial gap motor.

5. The in-wheel motor of claim 4, wherein the shoulder portion comprises one or more selected from the group consisting of a torque sensor, a rotation speed sensor, and a rotation angle sensor.

* * * * *